Nov. 25, 1924.

H. L. DUNCAN 1,516,808

SPEED AND DISTANCE INDICATOR AND RECORDER, ETC

Filed Aug. 28, 1919   3 Sheets—Sheet 1

Nov. 25, 1924.

H. L. DUNCAN

SPEED AND DISTANCE INDICATOR AND RECORDER, ETC

Filed Aug. 28, 1919  3 Sheets-Sheet 3

1,516,808

Inventor
Harry L. Duncan

Patented Nov. 25, 1924.

1,516,808

UNITED STATES PATENT OFFICE.

HARRY L. DUNCAN, OF MAHWAH, NEW JERSEY.

SPEED AND DISTANCE INDICATOR AND RECORDER, ETC.

Application filed August 28, 1919. Serial No. 320,356.

*To all whom it may concern:*

Be it known that I, HARRY L. DUNCAN, a citizen of the United States, now residing at Mahwah, Bergen County, State of New Jersey, have made a certain new and useful Invention Relating to Speed and Distance Indicators and Recorders, Etc., of which the following is a specification, taken in connection with the accompanying drawings, which form part of the same.

The invention in this case, which is a partial continuation of my co-pending application, Serial No. 137,446, renewed December 16, 1916, originally Serial No. 753,495, filed March 11, 1913, that is, contains subject-matter taken therefrom, relates to speed and distance indicators or recorders which are adapted for use on railroad or other vehicles making schedule runs. A compound or combined record may be arranged in connection with cooperating distance and time feeding or marking devices and with speed marking devices so as to form, on the tape or other record, markings showing the travelled distance in connection with a previously formed distance schedule so as to directly compare the actual distance travelled with the schedule distance for the same time. The speed indicating or marking devices also preferably form a marking on a comparable portion of the record, thus recording the momentary speed of the vehicle throughout its run and furnishing valuable indications to the operator in connection with a previously formed speed schedule and also if desired a maximum allowable speed schedule for the corresponding portion of the route. In the case of distance feed records suitable resetting aligning devices may be employed to reset the record at suitable intervals in accurate alignment track or route members cooperating with the passing vehicle so as to insure the substantial accuracy of the route and other indications on the record throughout the run of the vehicle. For some purposes it is desirable to have the record which may comprise suitable route or map data fed forward at a speed somewhat slower than corresponds to the actual speed of the vehicle. Then when the vehicle passes or comes into cooperation with one of the track or route members, the speed of the record feed may be momentarily increased, as by the action of overspeed feeding devices, so that the record is rapidly fed forward to such further amount as is necessary to effect its substantial realignment. This overspeed feeding may bring aligning devices or openings in the record into engagement with contact members adapted to thereupon stop the action of the overspeed feeding devices and restore the normal or slow feed of the record.

In the accompanying drawing showing in a somewhat diagrammatic way several illustrative embodiments of this invention.

Figure 1:
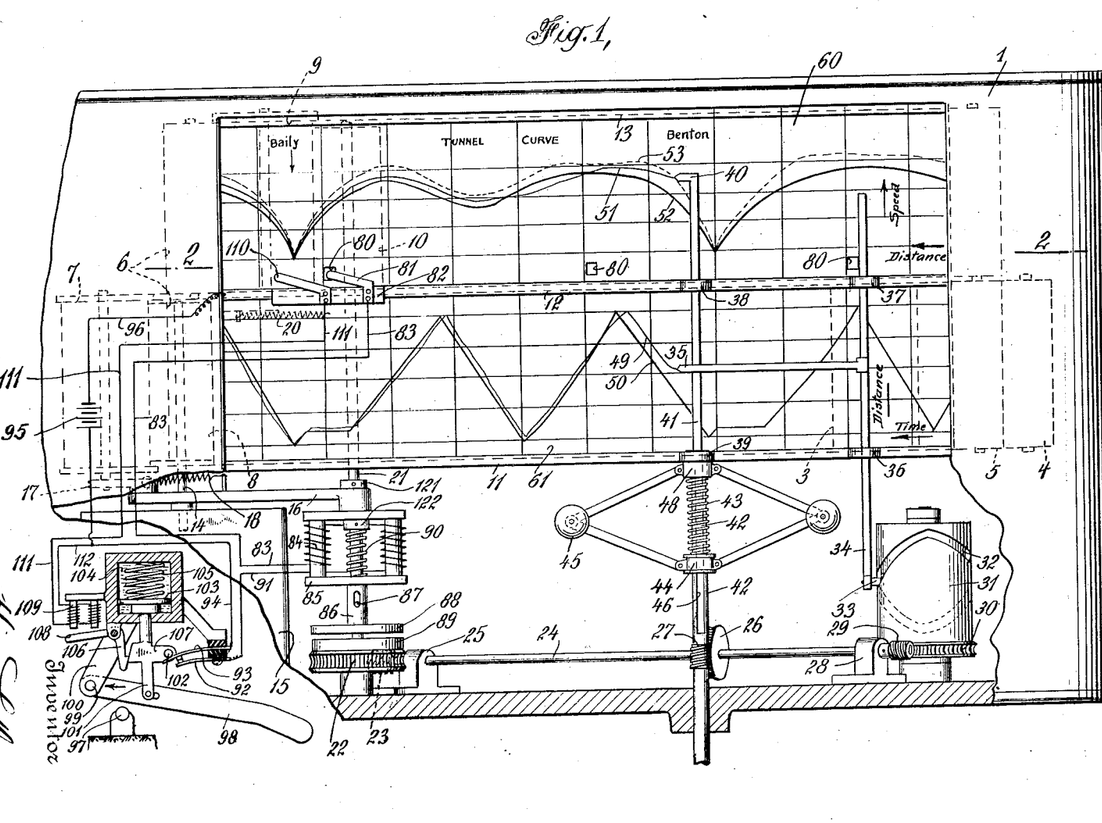
Fig. 1 is a front elevation, parts being broken away.
Figures 1, 2, 3, 4, 5:
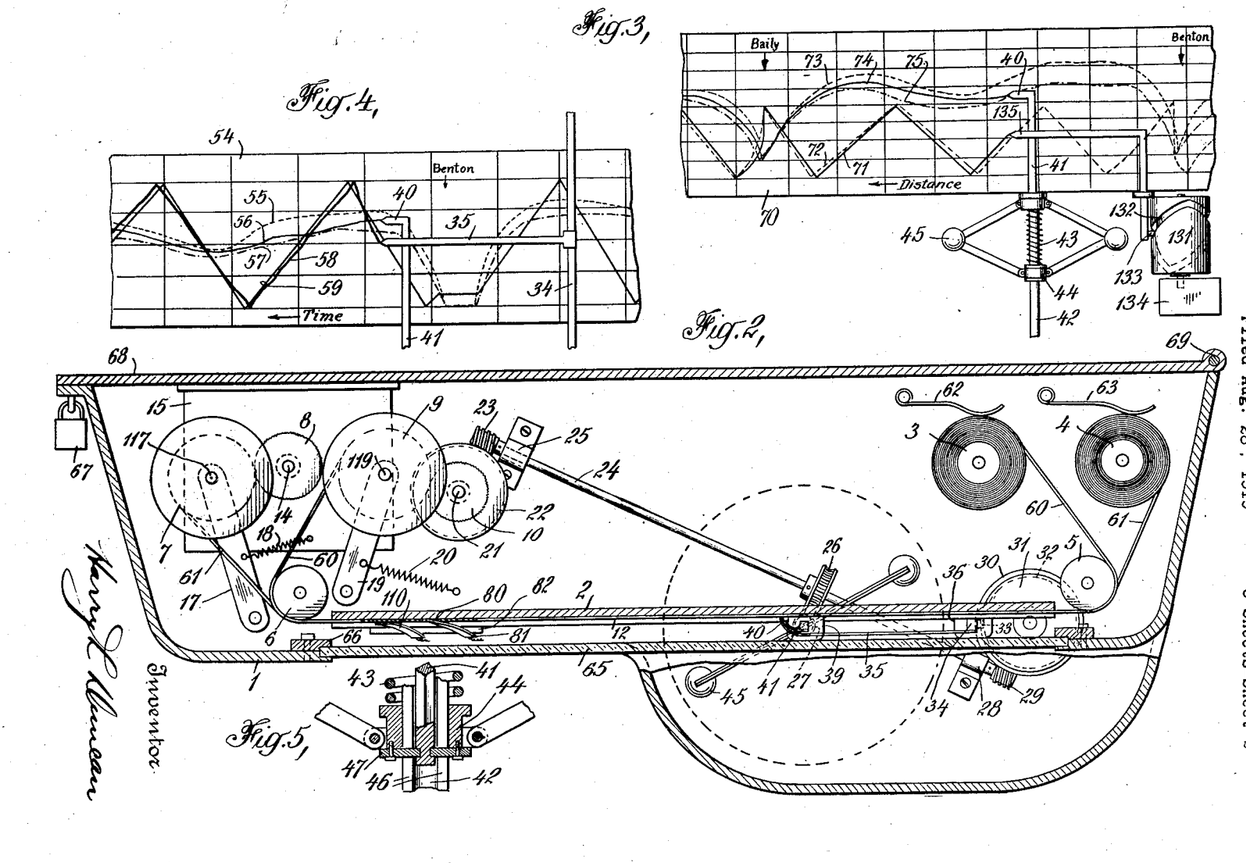
Fig. 2 is a horizontal section thereof taken substantially along the line 2—2 of Fig. 1.
Fig. 3 shows another arrangement.
Fig. 4 shows still another arrangement.
Fig. 5 a detail sectional view.

In the illustrative arrangement shown in Figs. 1 and 2, the indicating and recording mechanism may be mounted within any suitable protecting casing which may comprise one or more removable covers or doors 1 secured to the rear or casing member 68 as by the pivotal connections 69 and provided with suitable locking devices such as 67. This cover is preferably formed with one or more openings or windows to allow the record to be viewed from the outside of the recorder and these openings may be provided with panes of glass, such as 65, secured in position by the removable flange member 66 secured to the cover as indicated in Fig. 2. A suitable record support or plate, such as 2, may be arranged in any desired way within the casing to cooperate with this opening and in the case of a compound comparative record in tape form this support may comprise suitable record guides or flanges, such as 11, 12 and 13, to sufficiently embrace and support the edges of the one or more tapes employed. Suitable guide rolls, such as 5, 6, may be arranged adjacent both ends of the record support, as shown in Fig. 2 and the record tapes may be drawn from suitable rolls or reels 3, 4 mounted on stationary pins and engaged by suitable tension devices such as the spring tension members 62, 63. The upper tape 60 may thus as indicated pass over the guide roll 5 and across the record support within the overhanging flanges of the record guides 12, 13 and then may pass over the guide roll 6 at the other end of this support and be drawn along at the desired rate by any suitable feeder mechanism. For example, this tape may pass over or be wound upon the feeder reel 9 preferably having suitable flanges at one or both ends and engaged by the feeder roll 10 having a sufficiently roughened or gripping periphery to feed the record along at the desired rate when this feeder roll is driven by any desired mechanism. The feeder reel may be conveniently mounted on the pin 119 in the movable feeder arm 19 which may be pivotally mounted as indicated and normally drawn toward the feeder roll by a suitable spring 20. In this way the substantially uniform linear feed of the record tape is insured and convenient removal and replacement of the tapes is secured by swinging the feeder arm outward against the action of its spring sufficiently to disengage the reel from the feeder roll and allow this reel to be removed from the pin and replaced by another. The cooperating record tape 61 forming this compound comparative record may be drawn from the lower roll or reel 4 and pass over a suitable guide roll, such as 5, and then after passing across the record support between the record guides 11, 12, this tape may pass over the guide roll 6 at the other end of the support and be wound up on a similar reel 7 detachably mounted on the pin 117 in the lower swinging arm 17 normally drawn by the spring 18 toward the feeder roll or device 8, so that the tape is thereby uniformly wound up on the reel.

One of these records, such as 61, may be a time fed record tape on which oscillatory or zigzag distance markings are made by any suitable marking device. This tape may be conveniently fed along the record support in proportion to the elapsed time by driving the time feeder roll or device 8 by a suitable clock mechanism 15 connected to the shaft 14 of this feeder roll. For the convenience of reading, this time fed tape may have any suitable time scale or indications thereon, such as the vertical lines indicated which may of course be numbered to indicate hours or fractions thereof as desired. The oscillatory distance marking may be made on this record by any suitable mechanism of this character, such, for instance, as the distance marker 35 which may be attached in any way to the distance marker rod 34 guided as in the guideways 36, 37, during its reciprocation. This marker rod and marker may be oscillated by a suitable distance cam 31 having the helical cam groove 32 cut therein so that through the cam follower 33 on the marker rod an oscillatory movement is imparted to the marker in proportion to the distance travelled by the vehicle when the cam is rotated in proportion to the distance travelled. This may be done in any suitable way, as for instance, by the driving worm 27 connected by a flexible shaft or other reducing gear to the wheel or driving gear of the vehicle and meshing with the worm wheel 26 on the worm shaft 24 which may be mounted in suitable bearings, such as 25, 28. This worm shaft may have thereon a cam worm 29 meshing with the worm wheel 30 on the cam 31 which is thus driven in proportion to the distance travelled by the vehicle. The oscillatory distance marker is thus moved over the time distance record, and may be of resilient silver strip or other marking material, and produces a zig-zag distance marking 49 on this clay loaded or otherwise prepared record from which the total distance travelled can be readily computed as well as the length of stops and so forth, and if desired this record may have thereon a suitable distance scale or indications, such as the longitudinal lines appearing in Fig. 1, which may of course be designated as indicating miles or suitable fractions or multiples thereof. This record may also with advantage be formed with a distance schedule by printing or otherwise forming thereon this standard distance schedule line 50 which may correspond to an actual or computed run of a vehicle over the route in question. The actual distance record for the trip is formed by the oscillatory distance marking on this same record 61 in the form of a superimposed line 49 which permits the ready visual comparison of the travelled distance with the scheduled distance for the same time. Since this record is fed along in proportion to the elapsed time all points in the same line transversely across the record correspond to the same elapsed time so that by comparing any point in the actual distance marking 49 with the corresponding point directly above or below on the scheduled distance record line 50 it can be readily seen whether the vehicle is ahead or behind its schedule at that time. For example, the marker 35 is shown as traveling downward in Fig. 1 and at once indicates that the vehicle is behind its schedule by the distance corresponding to the vertical displacement of this marker from that part of the distance schedule 50 directly below the marker point.

The cooperating record 60 shown in Fig. 1 may be a distance feed record on which any suitable momentary or instantaneous speed marking is made by suitable mechanism. This tape record may be fed forward in proportion to the distance travelled by the vehicle by any desired feed devices which may comprise the distance feeder roll or device 10 mounted on the shaft 21, as shown in Figs. 1 and 2, and driven in any way as by the distance feeder wheel 22 engaged by the cooperating worm 23 on the worm shaft 24. The momentary speed marking on this record may be made by the speed marker 40 which may be of thin resilient silver or other suitable marking material to produce the desired marking on the clay loaded or other suitable paper forming the record, as in the case of the distance marker 35. This speed marker may be operated by its connection with the speed marker rod 41 having square or other non-circular section and guided in the guide bearing 38, its lower end being moved longitudinally in proportion to the speed of the vehicle by any desired speed indicator device. For example, the lower end of this marker rod may pass within the hollow indicator shaft 42 and be provided with a reduced neck, as shown in Fig. 5, which may be engaged by the swivel plate 47 passing through the longitudinal slots 46 formed in the indicator shaft 42 and secured to the motion bearing 44 loosely mounted on the outside of this indicator shaft. This motion bearing may be pivotally connected to the weighted indicator arms 45 of usual construction which are also pivotally connected to the indicator head 48 secured to the shaft 42 above and guided in the stationary bearing 39. The indicator spring 43 may, if desired, be interposed between the motion bearing 44 and the indicator head 48, so that the centrifugal action on this indicator raises the motion bearing and speed marker more or less according to the speed of the indicator shaft which may be proportionate to the speed of the vehicle as previously indicated. The speed marking thus made on the distance feed record indicates the momentary speed of the vehicle at that particular time and a suitable speed scale or indications may of course be formed on this record tape and graduated in miles per hour, or any other desired system of units. This record 60 is also preferably provided with a momentary speed schedule which may be printed or otherwise formed thereon in any desired way according to the observed or calculated speeds for a schedule run over the route in question. This standard speed schedule is shown as 52 and of course varies for different parts of the route, falling to zero at the stations where stops are made and otherwise varying in accordance with the grades, curves and other route conditions. It is also of advantage to have a maximum allowable speed schedule formed on such a record such as the line 53 which may with advantage be in the form of a heavy red line indicating a dangerous speed condition for that part of the route. The operator thus has before him at all times a visual indication of the relation of the momentary speed of the vehicle at that time to the scheduled speed decided on as standard for that part of the route and also to the maximum allowable speed therefor, so that in case it is necessary or desirable to make up time, the speed of the vehicle can be increased so that the marker is brought up above the speed schedule line 52 and makes the actual speed marking 51 between this line and the maximum allowable speed schedule marking 53 as shown in Fig. 1. It is also of advantage to have such a record carry suitable route indications such as the names of the various stations or stops and some at least of the more important features of the route, such as tunnels or curves in the case of railroads, or special grades or the like in the case of automobile busses or other vehicles making quite regular runs over a definite route. As seen in Fig. 1, the two elements of this compound comparative record are fed forward from right to left and the markers are preferably arranged to cooperate most directly and obviously, and may engage directly comparable portions of the records which as indicated are substantially in the same vertical line, the distance marker for this purpose being brought over the speed marker rod as seen in Figs. 1 and 2. The value of some such travelled distance momentary speed records or indications in connection with superimposed or comparative schedules therefor can be seen by referring to Fig. 1, since the operator can readily see from the time distance record the amount that the train or vehicle is behind the scheduled travelled distance for that time and then by referring to the momentary speed marking directly above can see how the speed of the vehicle compares with the scheduled and maximum allowable speed for that part of the route and regulate running conditions accordingly.

In the case of long railroad runs, for example, especially where there are many curves, it is desirable to maintain the alignment of the distance feed tape or other record as by the use of record resetting aligning devices operated or controlled by track or route members which may be located at suitable intervals along the track or otherwise cooperate with the vehicle in any way. For this purpose, the distance feed record may be formed with any suitable aligning devices which may control the definite or substantial resetting of the record at that point in connection with the corresponding route member so as to ensure the accurate alignment of the distance record with the corresponding portion of the route travelled at any desired intervals of a mile, or any fraction or multiple thereof. For this purpose the distance record 60 may, for example, be provided with aligning devices in the form of apertures 80 punched or otherwise formed therein at the desired distances apart corresponding to distance intervals of a mile or so, for example, and cooperating stop members such as the electric contact member 81 may cooperate therewith, so that when each aligning device or aperture comes under the stop member the paper record no longer prevents this stop member from making electrical contact with the metallic record support or plate for example. This stop member may be conveniently mounted on an insulating block 82 and be connected by the wire 83 with any suitable stop device, such as the magnet 84, the other end of this circuit 91 preferably comprising suitable controller stop device contacts, such as 92, 93 connected by the wire 94 with the battery or other source of electricity 95 and then through the wire 96 with the record support 2. This magnetic stop device 84 may act on a disk armature 85 mounted on the sleeve 86 having a suitable slot engaged by the pin 87 in the distance feeder shaft 21, for example. When this powerful magnetic stop device is actuated by the aligning aperture 80 coming under the stop member 81 this armature and sleeve are drawn up against the strong feed spring 90 thus retracting the connected feed device or friction clutch 88 and disengaging this clutch member from the cooperating member 89 on the distance feed wheel 22 sufficiently to at least considerably retard the feed of the record. Since this magnetic stop device is mounted on the stationary bracket 16 its action may not only disengage the feed clutch, so that the feeder wheel 22 no longer rotates the distance feeder shaft 21 which for this purpose may be loose therein and longitudinally guided as by the collars 121, 122 on this shaft on either side of the bracket 16; but also the stop device may draw the armature 85 which is pinned to this distance feed shaft into holding engagement with the magnetic stop device so that so long as these conditions are maintained the distance feed shaft and distance record are held stationary, the aligning aperture 80 being in exact alignment with the stop member 81. To allow for any reasonable amount of wheel slip or other irregularity in the vehicle driving connections or record feeding mechanism it is desirable to have the feeding devices so proportioned as to normally overfeed the record tape to the extent of a few percent or so, thus bringing each aligning aperture in the record into its aligned position in connection with the stop member a little before the vehicle comes into cooperation with the corresponding route member which may release the stopping device and restart or restore the normal operation of the record feeding mechanism in any desired way. As shown in Fig. 1 the route or track member may comprise a pin or other projection 97 in the path of a suitable resetter arm, such as 98, which may be pivoted about the pin 99 in the bracket 100 on the vehicle and also be connected in any desired way as by the pin and slot connection indicated with the resetting controller 101. For some purposes, it is desirable to have this controller connected with a suitable cushioning device, such as the cushioning piston 103 operating in the cushioning cylinder 104 containing glycerine or other suitable fluid, and also to have the spring 105 normally forcing the controller into its downward position indicated in which through a suitable pin 102, for example, it holds the controller stop device contacts 92, 93 in electrical connection. When, however, the vehicle passes the track member 97 the resetter arm is quickly raised, thus carrying the connected resetting or restarting controller up into its restarting position and allowing the resilient contact member 93 to spring upward away from the member 92 which breaks the electrical circuit through the magnetic stop device and allows the heavy spring 90 to force the feed device or clutch into engagement again, thus again starting the normal feed of the distance tape. The cushioning device holds the resetting controller in raised position for some time after passing the track member and it may be more definitely held in this raised record feeding or restarting position by suitable means such as the retainer 106 which may be pivotally mounted so that this latch swings under the projection or catch 107 on the controller and positively holds it in raised position. This retainer may be released when the distance tape has again started forward by providing a suitable controller releasing member or contact 110 so as to cooperate with the aligning aperture 80 after the distance tape has moved forward to the desired extent, so that under these circumstances a current from the battery 95 passes through the record support and through this contact member 110 and wire 111 so as to energize the magnetic controller release device 109 and draw up the armature 108 on the retainer 106 whose latch is thus withdrawn from the controller which may be returned by its spring 105 to its normal position shown in full lines for proper cooperation with the succeeding route member.

For some purposes it is more convenient and desirable to have both the travelled distance and momentary speed markings on a single combined comparative record as shown in Fig. 3. This record 70 may be a distance feed record which is fed forward in proportion to the distance travelled by the vehicle and may be provided with suitable route indications of any kind and with suitable distance scales or indications. An oscillatory time distance marking may be made on this record by a time marker 135 having a connected cam follower 133 cooperating with a cam groove 132 in the time cam 131 which may be rotated by a clock mechanism 134. In this way the zig-zag marking 71 is made on the tape indicating the travelled distance in connection with a suitable time scale or indications showing the hours or fractions thereof by suitable horizontal lines in this part of the record. A similarly formed or computed distance schedule 72 is also printed or otherwise formed on the tape in connection therewith, so that the relation of the total distance travelled at any time can be visually compared with the corresponding scheduled distance. This may be readily done as indicated, since corresponding horizontal points on these two records or markings correspond to the same time. Thus the time marker 135 indicates that the vehicle is somewhat behind its schedule since the distance travelled is not quite as much as should have been travelled in this same time because the distance schedule line 72 indicates a greater travelled distance than has actually been passed over by the vehicle. The speed marker 40 shown as cooperating with this combined tape record may be actuated by mechanism similar to what has been already described in connection with Figs. 1 and 2 so as to make a momentary speed marking 74 on this record for direct comparison with the momentary speed schedule 75 and the maximum allowable speed schedule 73 which may be formed on the record in any desired way. Another arrangement is shown in Fig. 4 in which the time feed record 54 is used which may be fed forward by a clock actuated feeding device similar to that used in connection with the record 61. This record 54 may be provided with suitable time indications in hours or fractions thereof which may be designated in any desired way and any suitable distance marker such as the oscillatory distance marker 35 on the marker rod 34 may cooperate with this record to form the zig-zag distance marking 58 thereon for direct comparison with the distance schedule line 59 which may be previously formed on the record. The speed marker 40 on the marker rod 41 may also cooperate with comparable portions of this record, preferably in about the same transverse position so as to form a directly comparable momentary speed marking 56 thereon with which may be advantageously used a previously formed speed schedule 57 and maximum allowable speed schedule 55. Suitable route or station indications may also be formed on this record where the runs are made in approximately schedule time.

Instead of the arrangement previously described in which the distance feed records preferably normally overfeed to the extent of a few per cent at least and then through the action of the aligning devices are periodically stopped or fed forward at a reduced or retarded rate until the normal feed of the record is restored through the cooperation of the route members, the realignment of the record may be effected in the following way which is more advantageous from some standpoints. The distance feed records of any suitable form may in some instances be normally underfed, that is, fed forward at a rate a few per cent at least less than the normal rate of feed under standard railroad conditions, for instance. Then whenever the train or other vehicle comes into cooperation with a route member an accelerator device may be actuated so as to feed the record forward at an accelerated speed several times the normal speed of the record until an aligning device or aperture in the record is brought into engagement with the stop or aligning member, whereupon the normal reduced feed of the record may be resumed. This arrangement has the same advantage as the retarded rate aligning feed of the record previously referred to in that the record is always being fed forward to some extent so that the speed and other indications and the markings which are made on the record are not superimposed to an objectionable extent. This arrangement also has advantages for vehicles where the actual distance travelled is somewhat irregular or indeterminate as in aeroplanes, etc., where because of the wind and air conditions it is difficult to closely approximate the actual speed of the vehicle, so that it is desirable to allow a greater margin, the underfeeding of the record preferably being therefore, some five to thirty per cent less than the normal rate at which the record should be fed to exactly correspond to the speed of the vehicle. This normal underfeeding is for such service preferably made adjustable to suit wind and other conditions so that the distance feed record which may contain route indications or map data of various kinds can be kept in proper indicating position for regular schedule runs where the wind and slip are fairly constant and manually or automatically realigned at suitable intervals.

Figures 6, 7, 8, 9:
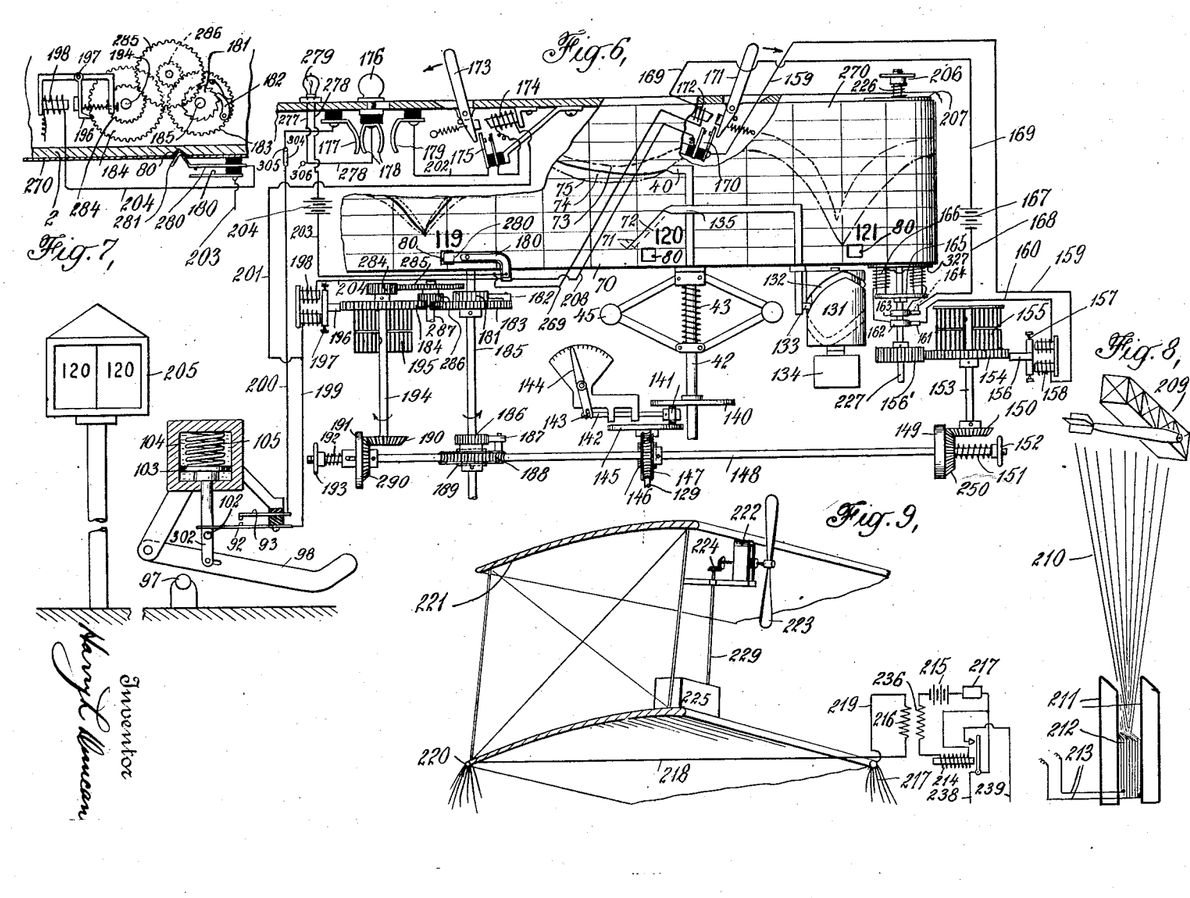
Fig. 6 is a front elevation in which parts are shown in section of another form of apparatus.
Fig. 7 is a partial horizontal section thereof.
Fig. 8 is a diagrammatic perspective view showing still another form of apparatus.
Fig. 9 is an enlarged detail thereof.

Fig. 6 shows an arrangement of such a normally underfed distance record 270 which may contain any suitable route or topographical indications as well as maximum allowable and standard speed schedule lines 73, 75 with which may cooperate an actual momentary speed indication or marking line, such as 74 made by a speed marker 40 which may be actuated by a centrifugal or other speed indicating device 45, 43 of the type described. This may comprise the indicator shaft 42 connected in any suitable way with the vehicle wheels or driving mechanism. This distance feed tape record 270 may also have suitable distance scale and speed scale indications or lines thereon and also, if desired, an oscillatory or other distance schedule 72 may be formed on this record so that an oscillatory distance indicator or marker 135 may cooperate therewith and form in connection therewith the oscillatory marking 71. The horizontal distance between these two lines at any time may thus indicate the distance that the vehicle is ahead of or behind its schedule. This distance marker may be actuated by the cam 131 driven by suitable clock mechanism 134 and formed with the cam groove 132 with which cooperates the follower 133 connected to the marker, these record lines and marking indicating device operating in the general way described in connection with the Fig. 1 and Fig. 3 devices.

The record feeding mechanism is according to this system preferably so arranged for railroad or similar service that the record is normally underfed to the extent of a few per cent and this may be effected by a worm shaft 148 carrying the worm wheel 147 in mesh with the worm 146 which may be arranged on the shaft 129 preferably driven by the vehicle wheels or driving devices as by being connected to the indicator shaft 42, for instance, by means of any suitable form of variable speed gearing. This may, for example, comprise the disk 140 on the shaft 42 and the cooperating disk 145 fixed on the shaft 129. The friction drive wheel 141 engaging both these disks may be adjusted in position from time to time by any suitable mechanism shown as comprising the rod or shaft 142 operating in suitable fixed bearings and carrying the friction wheel 141 revolubly mounted between suitable collars on this rod or shaft. The rod and friction wheel are longitudinally slidable under the action of the adjusting lever 144 having one end cooperating with a collar or pin 143 on the rod. In this way the speed ratio between the shafts 42 and 129 may be adjusted from time to time so that a greater or less degree of underfeeding of the record may be effected, or if, desired, the record may with such a device be fed at normal or overspeed in some cases. The worm shaft 148 may carry the worm 189 in mesh with the distance feeder worm wheel 188 connected to the distance feeder shaft 185 in any suitable way, as for instance by means of the spring pressed feeder pawl 187 on the worm wheel which may cooperate with a fine toothed ratchet 186 fast on the feeder shaft so as to feed the tape record 270 forward at the normal surface speed desired.

One illustrative form of an aligning overspeed feeding or accelerator mechanism for occasionally feeding forward this record at considerable overspeeds, such as several times the normal speed thereof for aligning purposes, may comprise a normally tensioned spring or weight connected with feeding mechanism which is normally restrained by a detent so arranged that it can be released and the accelerated feed effected whenever a route member cooperates with the vehicle. An arrangement of this kind may comprise one or more accelerator springs 195 connected to the spring shaft 194 which may have the bevel winding gear 190 on this shaft cooperating with a bevel gear 290 loose on the worm shaft 148. This gear 290 may cooperate with a spring slip clutch disk 191 keyed on this worm shaft and normally pressed against the gear by a spring 192, the tension of which may be adjusted from time to time by the adjusting nut or wheel 193. This gearing tends to quickly wind up the accelerator spring 195 and then when it has attained the desired tension slip occurs at the clutch disk 191 so that no further rotation of the bevel gear 290 takes place and the spring remains in this normal wound condition so that it can effect the accelerated or overfeeding of the record at any time. For this purpose an accelerator gear or ratchet 184 may be loosely arranged on the shaft 194 connected to the free end of the accelerator springs 195 so as to be rotated thereby and this gear or member may be connected through any suitable reducing and ratchet device with the feeder shaft 185. For example, the pinion 284 fast on this ratchet or gear 184 may mesh with the intermediate gear 285 on the shaft 287 which also carries the intermediate pinion 286 meshing with the accelerator wheel 183 loose on the feeder shaft 185. This accelerator wheel may carry a spring actuated pawl 182 normally held against the fine toothed ratchet 181 on the feeder shaft so as to allow the free forward rotation of this shaft which occurs in the normal feeding of the record while whenever the accelerator gear or ratchet is released the accelerator wheel revolves, whereupon this pawl drives the ratchet 181 so as to rotate the feeder shaft at more than its normal feeding speed, the feeder pawl 187 slipping on its ratchet 186 under these conditions. Any suitable form of accelerator detent may cooperate with the accelerator gearing to restrain the action thereof until the realignment of the record is to be effected at the desired intervals and for this purpose an accelerator detent 196 may as indicated in Figs. 6 and 7 be pivoted about the pin 197 and be normally spring pressed against the teeth of the accelerator ratchet 184. This may be withdrawn by any suitable devices whenever a route member comes into cooperation with the vehicle and for this purpose an accelerator magnet 198 may be arranged to cooperate with an armature on this detent so as to electrically withdraw the detent from the gear whenever a route member such as 97 comes into contact with the arm or aligning device 98 so as to throw upward the connected controller 302 which may have a pin 102 to engage the automatic controller contacts 92, 93 and force these normally separated spring contacts together so as to close the circuit between the wires 199 and 200, thus energizing the accelerator magnet 198 and allowing the accelerated or overspeed realigning feeding of the record as above described which may of course be controlled by any suitable speed governing or fly escapement devices to prevent undesirable acceleration. The controller 302 may have connected therewith the piston 103 in the dash pot 104 so that when it is forced forward against the action of the spring 105 it slowly returns, thus keeping these automatic controller contacts 92 and 93 closed for an ample time to effect the overspeed realignment of the record. This overspeed feeding therefor continues until the record is fed forward far enough to bring one of the aligning devices or apertures 80 in the record into engagement with the resetting or restoring contact device provided for this purpose. As indicated in Figs. 6 and 7 this may comprise a light spring contact 280 formed with a projecting or angular end 281 so as to resiliently enter any aligning recess 80 in the record 270 and this action breaks the electrical contact between this contact spring and the cooperating spring 180 which are in circuit with the accelerator magnet.

As indicated in Fig. 6 this circuit may comprise the battery or other source of electricity 204 and the wire 203 leading to the contact 180, the cooperating contact 280 being connected to the wire 204 leading to the accelerator magnet 198. Then the wire 199 may go to the automatic controller contacts 92, 93, from which the wire 200 may lead back to the battery 204 through various control devices to be described or through the switch 305 which when thrown over to the contact 306 effects this direct connection with the battery. It is thus evident that as soon as the accelerated or overspeed feeding of the record brings the next aligning aperture 80 into engagement with the restoring control contact device the circuit through the accelerator magnet is thereby broken when the aligning aperture is in substantially central engagement with the control contact member 281. The armature of this accelerator magnet is thereupon released and its spring brings the detent 196 into engagement with the accelerator ratchet 184 so that further accelerated feeding movement of the record thereupon ceases and the normal underfeeding thereof is resumed through the distance feed worm 188 and its ratchet 186.

For some purposes it is desirable to have a manual device for effecting the accelerated feeding of the record, so that, for example, in case of the failure of the automatic controller contacts or connected mechanism; the train operator may realign the record at any convenient intervals as when passing the mile posts along a railroad, for instance. So long as the switch 304 engages the contact 305 the wire 278 is connected to the battery 204 and to the spring contacts 178 connected to the manual control switch handle 176 projecting from the casing of the indicator or recorder. In the position shown in Fig. 6, this spring contact is in engagement with the cooperating spring contact 177 connected to the wire 200, but if this manual control switch is thrown over to the right its other spring contact 178 will then engage the spring contact 179, so that the battery connection 278 is then connected to the wire 202 leading to the manual accelerator contacts 175. These are normally open as indicated, but are adapted to be closed by a manual accelerator actuating device or lever 173, which when its exposed end outside of the casing is moved in the direction of the arrow engages and closes these accelerator contacts 175, thus closing the circuit through the accelerator magnet 178 the same as if the automatic controller contacts 92, 93 had been closed. The lever 173 may, if desired, be automatically held in this actuating position by a suitable holding magnet 174 which is energized when these contacts 175 are closed so as to normally attract the armature on the lower end of the lever and hold it in this actuating position until the circuit is broken by the restoring control contact device 281 previously described.

For some purposes it is desirable to have a manual retrograde actuating device for the record and for this purpose a similar mechanical actuating lever 171 may be pivotally or otherwise mounted to project from the recorder casing while it can be similarly spring held in the position indicated in Fig. 6. When this lever is thrown over in the direction of the arrow it closes the retarder contacts 170 and may be held in this actuating position by the cooperating holding magnet 172 in circuit with these contacts. One of these contacts may be connected by the wire 208 with the controller contact 280 while the return wire 269 connected to the other restoring control contact 180 may be connected with the holding magnet 172 from which the wire 169 leads to the battery 167. The wire 168 on the other side of this battery may lead to a brush 164 engaging the insulated contact ring 163 on the distance roll shaft 227 so as to lead the current to a retrograde clutch magnet 166 on this shaft. From this magnet the circuit goes to the other insulated collector or contact ring 162 with which the brush 161 engages. This brush is connected by the wire 160 with a retrograde detent magnet 158 so that whenever the lever 171 is swung over it energizes this detent magnet and also the retrograde clutch magnet 166. This clutch magnet thereupon grips the iron end 327 of the spool or roll on which the record is wound so as to positively rotate the same in unison with the roll shaft 227. At the same time the release of the detent 156 from the spring actuated retrograde gear 154 allows the springs 155 connected to this gear to rotate the same and simultanously rotate the meshing retrograde wheel 156' which rotates the roll shaft 227 in such direction as to move the distance record 270 rearward at an accelerated speed as compared with the normal underfeed of the record. This retrograde movement continues until the restoring controller device 281 cooperates with the next aligning aperture 80 in the record as shown in Fig. 7, whereupon the retrograde electric circuit described is interrupted and this feeding of the record ceases and the retrograde actuating lever 171 is also released so that its spring restores it to the inoperative position indicated in Fig. 6, the detent 156 thereupon being spring pressed against the retrograde gear 154 to stop its further movement. Under these conditions the roll or spool 327 carrying the distance feed tape record 270 can slip around against the poles of the deenergized clutch magnet 166 and a suitable tension of the tape record may be secured under these conditions by adjusting the force of the tension spring 226 by the screw collar or handle 206 on the upper end of this roll shaft 227. The retrograde springs 155 which are secured at one end to the retrograde gear 154 are secured at their other or upper end to the spring shaft 153 turning loosely in the gear and provided at its lower end with the bevel gear 150 meshing with the bevel gear 250 loose on the worm shaft 148. The clutch disk 149 which may be fast on this shaft may cooperate with this gear 250 against which it may be yieldingly pressed by the spring 151, the tension of which may be adjusted by the nut or handle 152 on the end of this worm shaft. Thus this retrograde spring may be normally tensioned by the revolution of the worm shaft and then the slipping of these friction clutch members keeps the spring tensioned until it has been used for the retrograde feeding of the record described. To facilitate such manual realignment of the record from time to time the aligning apertures 80 may be given numbers corresponding, for instance, to the mile posts or other route signals 205 which may be located along the route at regular or other intervals of one mile or more apart. When the operator of the train or other vehicle sees one of these mile posts or other route signals he can manually realign the record by operating the accelerating or retrograde actuating devices 173 or 171 so as to effect the manually accelerated feed of the record in the direction desirable to bring the properly numbered aligning aperture 80 into substantial alignment with the speed and distance markers on the record or into alignment with any other indication on the apparatus which may be provided for this purpose. As shown in Fig. 6 these aligning apertures 80 may be consecutively numbered as by the heavy numerals in connection therewith to correspond with the mile post or other route signals along the route of the vehicle so as to facilitate this manual realigning action. For some purposes it is desirable to have a visual or other signal which comes into operation during the special accelerated retrograde or other realigning feeding of the record, so that in case this operates for more than a few moments at a time the attention of the locomotive engineer or other attendant is called to this condition which indicates a possible irregular condition of the apparatus. For this purpose a signal light, such as 279, may be mounted on the casing of the indicator or recorder and connected as by the wires 277, 278 to the accelerator actuating circuit, for example, so that the light is lit whenever this accelerated feeding of the record is taking place.

In some cases it is desirable to have an automatic realignment of generally similar distance feed records in aeroplanes and while the manual realigning mechanism referred to may be used to readily effect the realignment of the record when any distinctive land marks or towns are reached on regular aeroplane routes it is sometimes desirable to effect the automatic realignment of the record through wireless actuating mechanism. For this purpose one or more wireless sending stations preferably with directive signaling apparatus of any well known or suitable character, may be used at each realigning or signalling station so as to transmit a relatively narrow band or plane of wireless waves transversely across the route of the aeroplane so as to actuate the realigning or other signalling mechanism thereon when the aeroplane comes substantially opposite this station whether directly above the same or not. As shown diagrammatically in Fig. 8 the transmitting mechanism 212 connected with the oscillatory circuit 213 may be given a directive character as for instance by operating between two large damping coils or circuits 211, so that only the waves 210 which are transmitted in a plane between these parallel damping circuits or devices are effective for acting upon the passing aeroplane, such as 209. Any suitable receiving devices may be arranged on the aeroplanes for receiving such aligning signals, and for instance, receiving antennae 217 and 220 may be provided on the lower trailing or other portions of the aeroplane as indicated in Fig. 9 and connected with an oscillatory receiving relay circuit which may comprise the wires 218 and 219 leading from these antennae through a coil 216 arranged in inductive relation with another coil 236 into the relay circuit, including for instance a battery 215 and a detector 217 of any suitable character and also the winding of the relay magnet 214 so that the wireless signal can energize this relay magnet so as to close the relay contacts and allow current to pass through the relay circuit connections 238, 239 which may be connected to the wires 199, 200 in Fig. 6 so that this wireless actuating relay may take the place of the automatic controller contacts 92, 93 and the cooperating actuating devices by which the contacts are mechanically actuated by the passing route member 97.

As indicated in Fig. 9, the special protective casing 225 for the recorder or indicator apparatus may be mounted at any convenient position on the aeroplane and may be operated by the shaft 229 corresponding generally to the indicator shaft 42 of the Fig. 6 apparatus. This shaft may be connected in any suitable way with the fan operated magneto usually employed on aeroplanes which may as diagrammatically indicated in Fig. 9 comprise the fan or propeller 223 operating the magneto 222 to which the bevel gears 224 may connect this operating shaft 229.

This invention has been described in connection with a number of illustrative embodiments, forms, proportions, materials, parts, devices, arrangements, and methods of operation and use, to the details of which disclosure the invention is not of course to be limited, since what is claimed as new and what is desired to be secured by Letters Patent is set forth in the appended claims.

I claim:

1. In speed recorders or indicators, a distance feed record having thereon a maximum allowable speed schedule, adjustable speed record feeding devices adapted to adjust the speed at which said record is normally fed with respect to the speed of the vehicle, a speed indicating device cooperating with said record to produce a momentary speed indication in connection with said schedule, and cooperating means to indicate the relation of the distance travelled by the vehicle to the schedule distance for the same time.

2. In distance and speed indicators, a record having thereon a maximum schedule, means to indicate the relation of the distance travelled by the vehicle to the scheduled distance for the same time, and an indicator cooperating with said record to give an indication of the corresponding momentary condition in connection with said schedule.

3. In speed recorders or indicators, a distance feed record having thereon a maximum allowable speed schedule, a speed indicating device cooperating with said record to produce an indication of the momentary speed in connection with said schedule, and cooperating means to indicate the relation of the distance travelled by the vehicle to the scheduled distance for the same time.

4. In speed recorders, a distance feed record having thereon standard and maximum allowable speed schedules, a speed marker cooperating with said record to produce thereon a momentary speed marking superimposed on said schedules, and cooperating means to indicate the relation of the distance travelled by the vehicle to the schedule distance for the same time.

5. In distance and speed indicators and recorders, a record having thereon a distance schedule and a maximum speed schedule, related distance indicating and record feeding devices cooperating with said record to superimpose the actual distance marking on said distance schedule and a speed indicating device cooperating with said record to superimpose the actual speed indication on said speed schedule.

6. In distance and speed indicators and recorders, a record having thereon a standard speed schedule and a maximum speed schedule, cooperating means to indicate the relation of the distance travelled by the vehicle to the scheduled distance for the same time, and a speed marker cooperating with said record to produce a momentary speed marking thereon superimposed on said speed schedules.

7. In indicators, a record having thereon route related indications, an indicator cooperating with said record to give an indication in connection therewith, and a cooperating adjustable speed record feed device to feed said record forward with respect to said indicator.

8. In indicators, a record having thereon route related indications comprising a maximum allowable schedule corresponding to the different route conditions, and an indicator cooperating with said record to give a corresponding actual indication in connection therewith.

9. In distance and speed indicators or recorders, a distance feed record having thereon route indications and a speed schedule, cooperating means to indicate the relation of the distance travelled by the vehicle to the scheduled distance for the same time, and a speed marker cooperating with said record to produce a speed marking thereon.

10. In recorders or indicators, a tape record having thereon route indications, a standard speed schedule and a maximum speed schedule, a speed indicating device cooperating with said record to automatically superimpose a corresponding actual speed indication thereon and a record feed device to feed said record in substantial proportion to the distance travelled by the vehicle.

11. In recorders or indicators, a record having thereon a standard schedule and a maximum schedule, an indicating device cooperating with said record to superimpose a corresponding actual indication thereon, and a record feed device to feed said record.

12. In recorders or indicators, a distance feed record having thereon a maximum schedule, an indicating device cooperating with said record to produce an indication of the corresponding momentary condition in connection with said schedule and cooperating means to indicate the relation of the distance travelled by the vehicle to the scheduled distance for the same time.

13. In recorders or indicators, a record having thereon a maximum schedule, and an indicating device cooperating with said record to produce an indication of the corresponding momentary condition in connection with said schedule.

14. In recorders or indicators, a record having thereon a maximum speed schedule, and a speed indicating device cooperating with said record to produce a momentary speed indication in connection with said schedule.

15. In speed recorders, a distance feed record having thereon a maximum allowable speed schedule and a speed marker cooperating with said record to produce thereon a momentary speed marking superimposed on said schedule.

16. In recorders, a record having thereon route related indications including a standard speed schedule and a maximum allowable schedule, a marker cooperating with said record to superimpose a corresponding actual record marking thereon, and a cooperating record feed device to feed said record forward with respect to said marker.

17. In recorders or indicators, a distance feed record having thereon route related indications, a normal record feeding device to normally feed said record in substantial proportion to the distance travelled by the vehicle and at a rate slower than corresponds to said indications, and record aligning means comprising aligning devices formed at intervals in said record, a restoring control contact device comprising normally closed restoring contacts and adapted to disengage said contacts when said contact device engages one of said aligning devices in the record, a cooperating automatic control device on the vehicle and comprising normally open control contacts adapted to be closed when the vehicle comes into cooperation with one of the route members arranged along the route of the vehicle, accelerated record feeding devices adapted to feed said record forward at accelerated speed and cooperating actuating devices comprising an accelerator circuit connecting in series said automatic controller contacts and said restoring control contacts to effect the accelerated feeding of said record to the succeeding aligning device when said accelerator circuit is closed.

18. In recorders or indicators, a distance feed record having thereon route related indications, a normal record feeding device to normally feed said record in substantial proportion to the distance travelled by the vehicle and at a rate slower than corresponds to said indications, and record aligning means comprising aligning devices formed at intervals in said record, a restoring control contact device comprising normally closed restoring contacts and adapted to disengage said contacts when said contact device cooperates with one of said aligning devices in the record, an automatic control device on the vehicle and comprising normally open control contacts adapted to be closed when the vehicle comes into cooperation with one of the route members arranged along the route of the vehicle, accelerated record feeding devices adapted to feed said record forward at accelerated speed and cooperating actuating devices comprising an accelerator circuit connecting said automatic controller contacts and said restoring control contacts to effect the accelerated feeding of said record.

19. In recorders or indicators, a distance feed record having thereon route related indications, a normal record feeding device to normally feed said record in substantial proportion to the distance travelled by the vehicle and at a rate slower than corresponds to said indications, and record aligning means comprising aligning devices formed at intervals in said record, a restoring control contact device adapted to be operated when cooperating with one of said aligning devices in the record, an automatic control device on the vehicle and adapted to be operated when the vehicle comes into cooperation with one of the route members arranged along the route of the vehicle, accelerated record feeding devices adapted to feed said record forward at accelerated speed and cooperating actuating devices comprising an accelerator circuit connecting said automatic control device and said restoring control contact device to effect the accelerated feeding of said record.

20. In combination, a distance feed record, a record feed device to feed said record in substantial proportion to the distance travelled by the vehicle, and record aligning means comprising aligning devices formed at intervals in said record and means operating at intervals during the travel of the vehicle to effect the substantial realignment of the feed of said record.

21. In recorders or indicators, a distance feed record having thereon route related indications, an indicator cooperating with said record, a record feed device to feed said record in substantial proportion to the distance travelled by the vehicle, and record resetting aligning means comprising aligning devices formed at intervals in said record and route members arranged at intervals along the route of the vehicle to effect the substantial alignment of said record.

22. In recorders, a tape record having thereon route indications, a marker cooperating with said record, a record feed device to feed said record at a rate related to the speed of the vehicle, and record aligning means comprising aligning devices formed at regular intervals in said record to bring said record into aligned position, route members arranged at regular intervals along the route of the vehicle, and means cooperating with said route members to restore the feeding action of said record feed device.

23. In combination, a distance feed record comprising route related indications, a normal record feeding device to feed said record in substantial proportion to the distance travelled by the vehicle, and record aligning means comprising aligning devices at intervals in said record, route members arranged at corresponding intervals along the route of the vehicle, record resetting abnormal-rate feeding means and cooperating automatic control devices adapted to be actuated by said route members and to intermittently actuate said record resetting means until the record is fed to an adjacent aligning device and to thereupon restore the normal feeding of said record.

24. In combination, a distance feed record comprising route related indications, a normal record feeding device to feed said record in substantial proportion to the distance travelled by the vehicle, and record aligning means comprising aligning devices at intervals in said record, route members arranged at corresponding intervals along the route of the vehicle, record resetting means and cooperating automatic control devices adapted to be actuated by said route members and to intermittently actuate said record resetting means until the record is aligned with an adjacent aligning device and to thereupon restore the normal feeding of said record.

25. In combination, a distance feed record comprising route related indications, a normal record feeding device to feed said record in substantial proportion to the distance travelled by the vehicle, and record aligning means comprising aligning devices at intervals in said record, route members arranged at corresponding intervals along the route of the vehicle, record resetting feeding devices comprising abnormal rate record feeding means and automatic control devices adapted to be actuated by said route members and comprising means to intermittently actuate said record resetting feeding devices until the record is fed to an adjacent aligning device and thereupon restore the normal feeding of said record.

26. In indicators, variable indicating means adapted to be carried by a vehicle and means to operate the indicating means in approximate accordance with the movement of the vehicle along its regular route to indicate at any point the maximum allowable speed of the vehicle therefor and for adjacent points further ahead along the route of the vehicle and resetting devices adapted to intermittently effect the realignment of said indicating means in connection with members arranged at intervals along the route of the vehicle.

27. In indicators, indicating means carried by a vehicle and actuated in approximate accordance with its movement to indicate at every moment the maximum allowable speed for the vehicle at any point along its route, and resetting devices adapted to intermittently effect the realignment of said indicating means.

28. In indicators, a record having thereon route related indications comprising a maximum allowable speed schedule corresponding to the different route conditions, in combination with an indicator to give a corresponding actual speed indication.

29. In speed indicators, a distance feed record having thereon a maximum allowable speed schedule and means cooperating with said record and adapted to be operated in accordance with the distance traveled by the vehicle to indicate in connection with said schedule the maximum allowable speed of the vehicle at any point the vehicle is then passing.

30. In indicators, variable indicating mechanism adapted to be carried by a vehicle, and means to cause the indicating mechanism to operate in accordance with the movement of the vehicle along its route to indicate at any point the maximum allowable speed of the vehicle therefor and for adjacent points further ahead along the route of the vehicle.

31. The combination with a vehicle of indicating means carried thereby for indicating at every moment the maximum permissible speed for the vehicle at the corresponding point along its line of travel and at adjacent points further along its line of travel and means connected with the running gear of the vehicle for operating the indicating means.

32. The combination with the running gear of a vehicle of a device for indicating its actual speed operated from such running gear, a track hazard indicator indicating the permissible speed of the vehicle at all times, and an operative connection between it and the running gear of the vehicle.

33. The combination with a vehicle, of variable indicating mechanism carried thereby for automatically indicating different speeds permissive along the route, according to the hazards at the different points, and means for moving the indicating mechanism as the vehicle traverses the route to indicate the proper speeds of said vehicle at different points along the route.

34. The combination with a vehicle, of variable indicating mechanism carried thereby, and means for causing the indicating mechanism to operate in accordance with the movement of the vehicle along the route to automatically indicate different speeds permissive along said route according to the hazards at the different points.

35. The combination with a vehicle, of means carried thereby for indicating at every moment for every point along its line of travel a permissible speed for the vehicle, and means for operating the indicating means as the vehicle traverses the line of travel and varying said permissive speed indication according to the hazards along the route.

36. The combination with a vehicle, of a maximum permissive speed indicator and a connected track hazard indicator.

37. In feeding and aligning mechanism adapted to feed and intermittently realign a record having thereon route related indications, a record feed device to feed said record at a rate correlated to the speed of the vehicle and record aligning means adapted to intermittenly cooperate with route members arranged at intervals along the route of the vehicle to thereupon effect the realignment of said record with respect to said record feed device.

38. In mechanism adapted to feed a distance feed record having thereon route related indications, a record feed device to normally feed said record in substantial proportion to the distance travelled by the vehicle and at a rate at least several percent slower than corresponds to said route related indications, and means to intermittently effect the realignment of said record with respect to said feed device and restore the normal feeding action thereof.

39. In mechanism adapted to feed a record having thereon route related indications, a record feed device to normally feed said record at a rate correlated to the speed of the vehicle and different than corresponds to said route related indications, and means to intermittently effect the realignment of said record with respect to said feed device while continuously feeding the record and to restore the normal feeding action thereof.

40. In feeding and aligning mechanism adapted to feed and intermittently realign a record having aligning devices at intervals, and having thereon route related indications, a record feed device to normally feed said record in substantial proportion to the distance travelled by the vehicle and at a rate a few percent at least different than corresponds to said route related indications, an electric member adapted to cooperate with said aligning devices and connected control devices adapted to cooperate with route members arranged at intervals along the route of the vehicle to intermittently bring said record into aligned position while continuously feeding the record and to restore the normal feeding thereof.

41. In feeding and aligning mechanism adapted to feed and intermittently realign a record having aligning devices at intervals and having thereon route related indications, a record feed device to normally feed said record at a rate correlated to the speed of the vehicle and different than corresponds to said route related indications, and electromagnetic record aligning means adapted to be actuated in connection with route members arranged at intervals along the route of the vehicle to intermittently bring said record into aligned position and restore the normal feeding thereof.

42. The combination with a vehicle of indicating means carried thereby for indicating at every moment the maximum permissible speed for the vehicle at the corresponding point along its line of travel and at adjacent points further along its line of travel, operating means connected with the operating mechanism of the vehicle for operating the indicating means, and cooperating aligning means adapted to be actuated to effect the occasional realignment of said indicating means in substantial accordance with the position of the vehicle along its line of travel.

43. In feeding and aligning mechanism adapted to feed and realign a record having aligning devices at intervals and having thereon route related indications, a normal record feeding device to normally feed said record at a rate correlated to the speed of the vehicle and different than corresponds to said route related indications, and realigning record feeding means adapted to cooperate with said aligning devices and comprising an accelerated record feeding device to intermittently bring said record into aligned position and restore the normal feeding thereof.

44. In feeding and aligning mechanism adapted to feed and realign a record having aligning devices at intervals and having route related indications, an adjustable speed normal record feeding device to normally feed said record at a rate substantially correlated to the speed of the vehicle and different than corresponds to said route related indications and realigning record feeding means to intermittently bring said record into aligned position and restore the normal feeding thereof.

45. In feeding and aligning mechanism adapted to feed and realign a record having route related indications, a normal record feeding device to normally feed said record at a rate substantially correlated to the speed of the vehicle and to said route related indications, and record realigning feeding means comprising an accelerated-speed record feeding device to intermittently bring said record into aligned position while continuously feeding the record and to then restore the normal feeding thereof.

46. In feeding and aligning mechanism adapted to feed and realign a record having route related indications, a normal record feeding device to normally feed said record at a rate substantially correlated to the speed of the vehicle and to said route related indications and record realigning means to occasionally bring said record into aligned position and then to allow the continued normal feeding thereof.

47. The combination with a vehicle of a record and indicating means carried by the vehicle for indicating at every moment the maximum permissible speed for the vehicle at the corresponding point along its line of travel and at adjacent points further along its line of travel, operating means connected with the operating mechanism of the vehicle for operating the indicating means in connection with said record, and cooperating aligning means comprising a visible variable element and adapted to be intermittently actuated to effect realignment of said record and indicating means in connection with the position of the vehicle along its line of travel.

48. The combination with a vehicle of a record and cooperating indicating means carried by the vehicle for indicating at every moment the maximum permissible speed for the vehicle at the corresponding point along its line of travel and at adjacent points along its line of travel, operating means connected with the running gear of the vehicle for operating the indicating means in connection with said record and cooperating aligning means adapted to be actuated to effect realignment of said record and indicating means in connection with the position of the vehicle along its line of travel.

49. In feeding and aligning mechanism adapted to feed and realign a record having route related indications, a normal record feeding device to normally feed said record at a rate correlated to the speed of the vehicle and realigning record feeding means comprising a delayed-return manual actuating device and an abnormal-rate record feeding device to intermittently bring said record into aligned position while continuously feeding the record and to then restore the normal feeding thereof.

50. In feeding and aligning mechanism adapted to feed and realign a record having route related indications, a normal record feeding device to normally feed said record at a rate correlated to the speed of the vehicle, and realigning record feeding means comprising a delayed-return actuating device to intermittently bring said record into aligned position while continuously feeding the record and to then restore the normal feeding thereof.

51. In feeding and aligning mechanism adapted to feed and intermittently align a record having aligning devices at intervals and having thereon route related indications, a normal record feeding device to normally feed said record at a rate approximately correlated to the speed of the vehicle and comprising a feeder shaft and a ratchet connection therefor, and record realigning means comprising realigning accelerated-speed record feeding devices having a ratchet connection with said feeder shaft and having a detent normally restraining the operation of said accelerated-speed record feeding devices, an operating spring to operate said accelerated speed record feeding devices and a yieldable clutch connection between said spring and the normal record feeding devices to keep said spring in actuating condition.

52. In feeding and aligning mechanism adapted to feed and intermittently align a record having thereon route related indications, a normal record feeding device to normally feed said record at a rate approximately correlated to the speed of the vehicle and comprising a feeder and a yieldable connection therefor, and record realigning means comprising realigning abnormal-speed record feeding devices having a yieldable connection with said feeder and having a detent normally restraining the operation of said abnormal-speed record feeding devices.

HARRY L. DUNCAN.